INVENTOR.
KENNETH D. GARNJOST
HERBERT A. WHITNEY

INVENTOR.
KENNETH D. GARNJOST
HERBERT A. WHITNEY

INVENTOR.
KENNETH D. GARNJOST
HERBERT A. WHITNEY

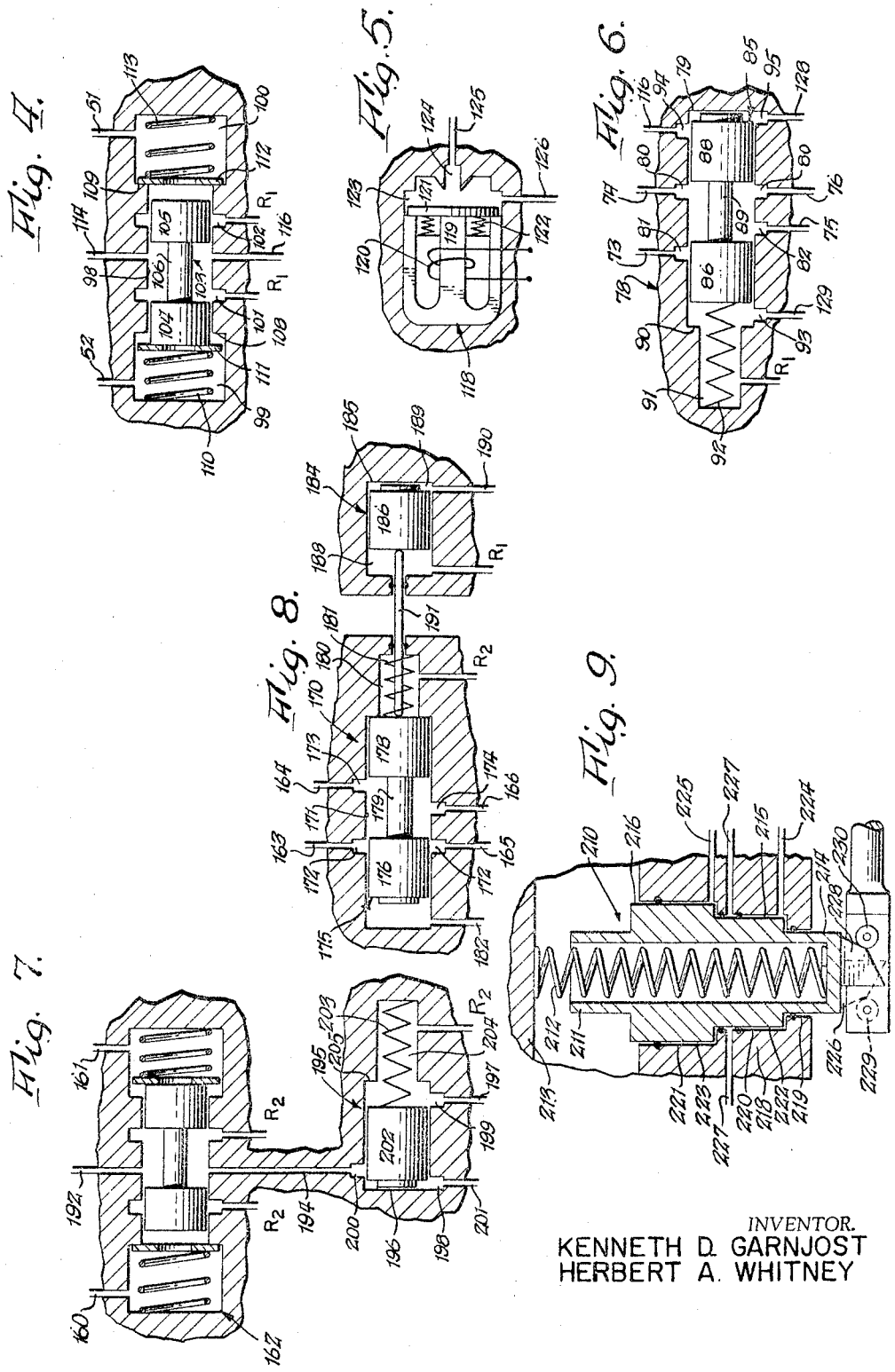

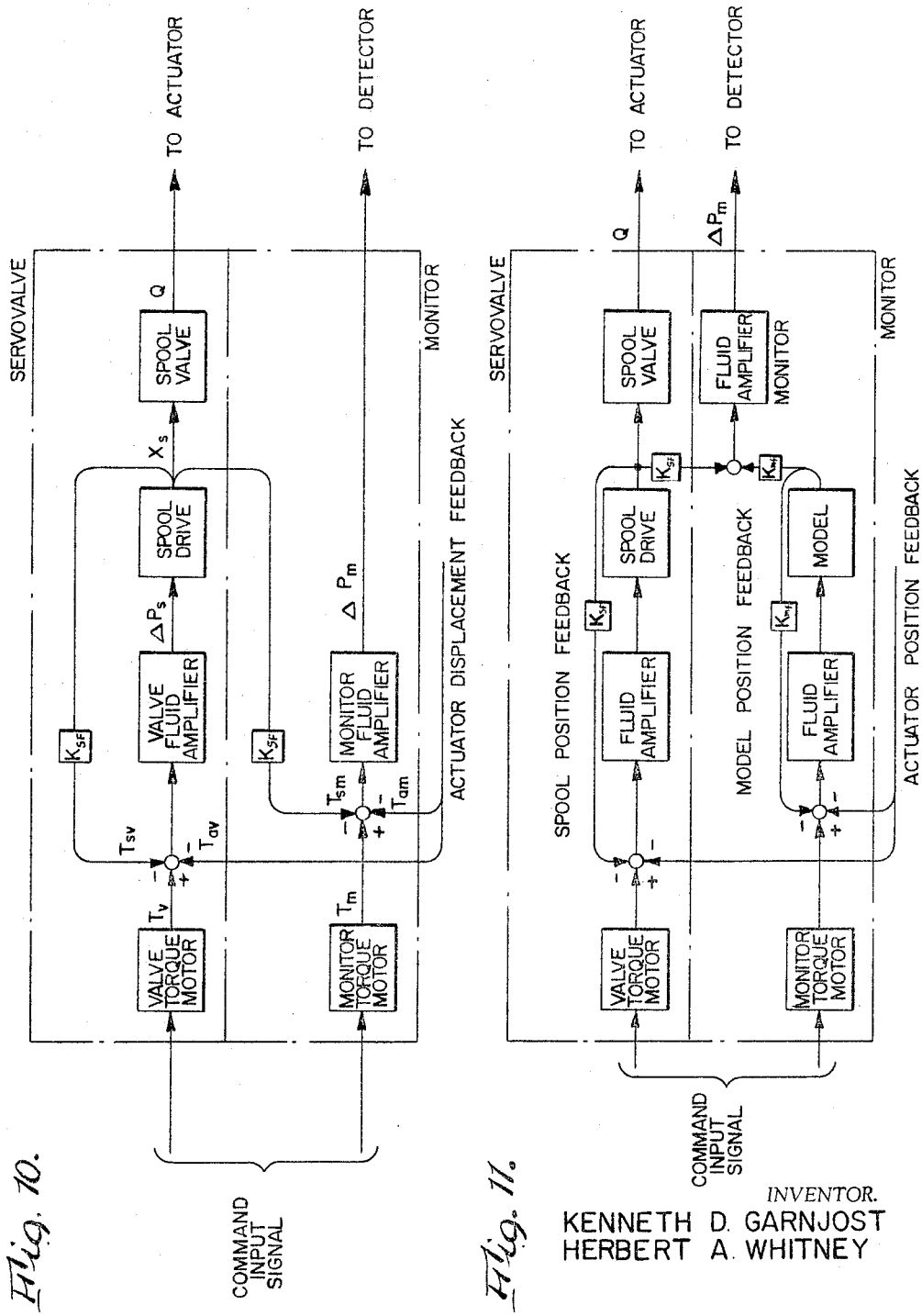

Sept. 6, 1966    K. D. GARNJOST ETAL    3,270,623
FLUID POWERED SERVOMECHANISM OF A REDUNDANT, MONITOR TYPE
Filed April 13 1964    6 Sheets-Sheet 6
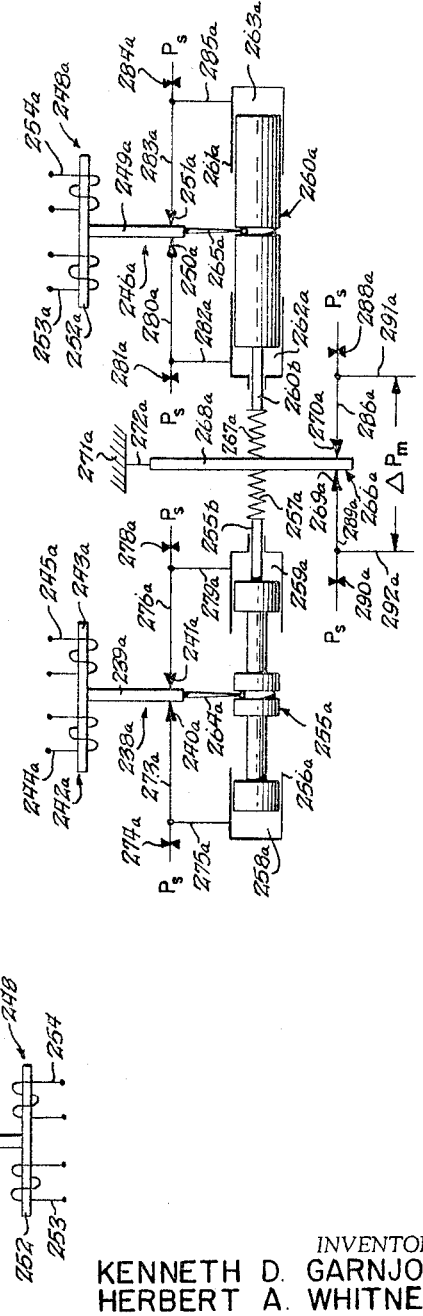
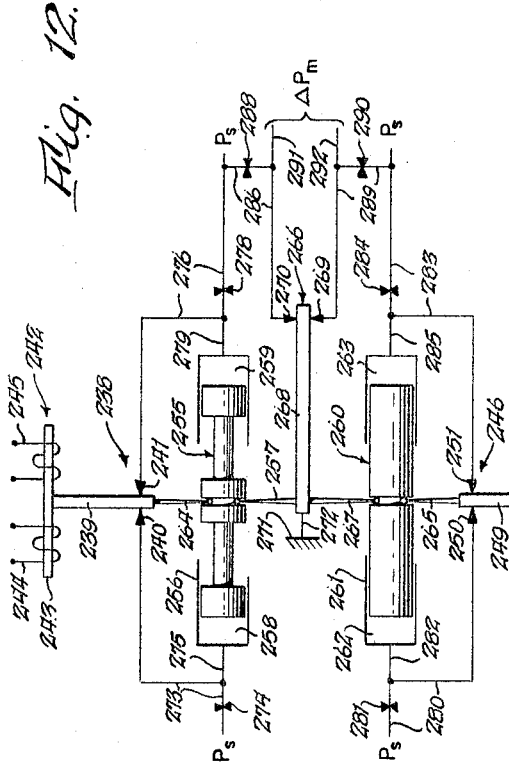
INVENTOR.
KENNETH D. GARNJOST
HERBERT A. WHITNEY United States Patent Office 3,270,623
Patented Sept. 6, 1966

3,270,623
FLUID POWERED SERVOMECHANISM OF A REDUNDANT, MONITOR TYPE
Kenneth D. Garnjost, Buffalo, N.Y., and Herbert A. Whitney, Clifton, N.J., assignors to Moog Inc., East Aurora, N.Y., a corporation of New York
Filed Apr. 13, 1964, Ser. No. 359,120
10 Claims. (Cl. 91—387)

This invention relates to improvements in fluid powered servomechanisms, and more particularly to one of a redundant, monitor type.

The primary object of the present invention is to provide a redundant servomechanism capable of detecting and correcting a failure within itself.

Another object is to provide such a servomechanism which will fail operative for any initial failure.

Still another object is to provide such a servomechanism which will fail safe for any second failure.

Another object is to provide such a servomechanism which is self-contained except for its command input signal.

Still other objects and advantages of the present invention will be apparent from the following description of several embodiments thereof taken in conjunction with the accompanying drawings in which:

FIG. 4 is a fragmentary enlarged longitudinal central sectional view of one of the detectors shown in FIG. 3 but illustrating the same in a displaced operative condition;

FIG. 5 is a fragmentary enlarged longitudinal central sectional view through one of the engage solenoids shown in FIG. 3 and illustrating the same in an open operative condition;

FIG. 6 is a fragmentary enlarged longitudinal central sectional view of one of the bypass and cutoff valves shown in FIG. 3 and illustrating the same in an operative condition in which it disengages its associated detector from the actuator;

FIG. 7 is a fragmentary enlarged longitudinal central sectional view of another detector shown in FIG. 3 with its associated relay valve and illustrating this detector in a displaced operative condition and the relay valve in a displaced inoperative condition;

FIG. 8 is a fragmentary enlarged longitudinal central sectional view of another bypass and cutoff valve shown in FIG. 3 with its associated interlock and illustrating this valve in an inoperative condition in which it engages its associated detector with the actuator and also illustrating the interlock in a displaced condition;

FIG. 9 is a fragmentary enlarged longitudinal central sectional view through the piston center lock shown in FIG. 3 and illustrating the same in an extended operative or locked condition;

FIG. 10 is a block diagram illustrating the essential components of the inventive monitor concept as embodied in failure-detection mechanism employing two fluid amplifiers;

FIG. 11 is a block diagram similar to FIG. 10 but illustrating the inventive monitor concept as embodied in failure-detection mechanism employing three fluid amplifiers;

FIG. 12 is a simplified fluid circuit diagram of one arrangement for carrying out the monitor concept as depicted in FIG. 11;

FIG. 13 is a simplified fluid circuit diagram of another arrangement for carrying out the monitor concept as depicted in FIG. 11.

Figure 1:
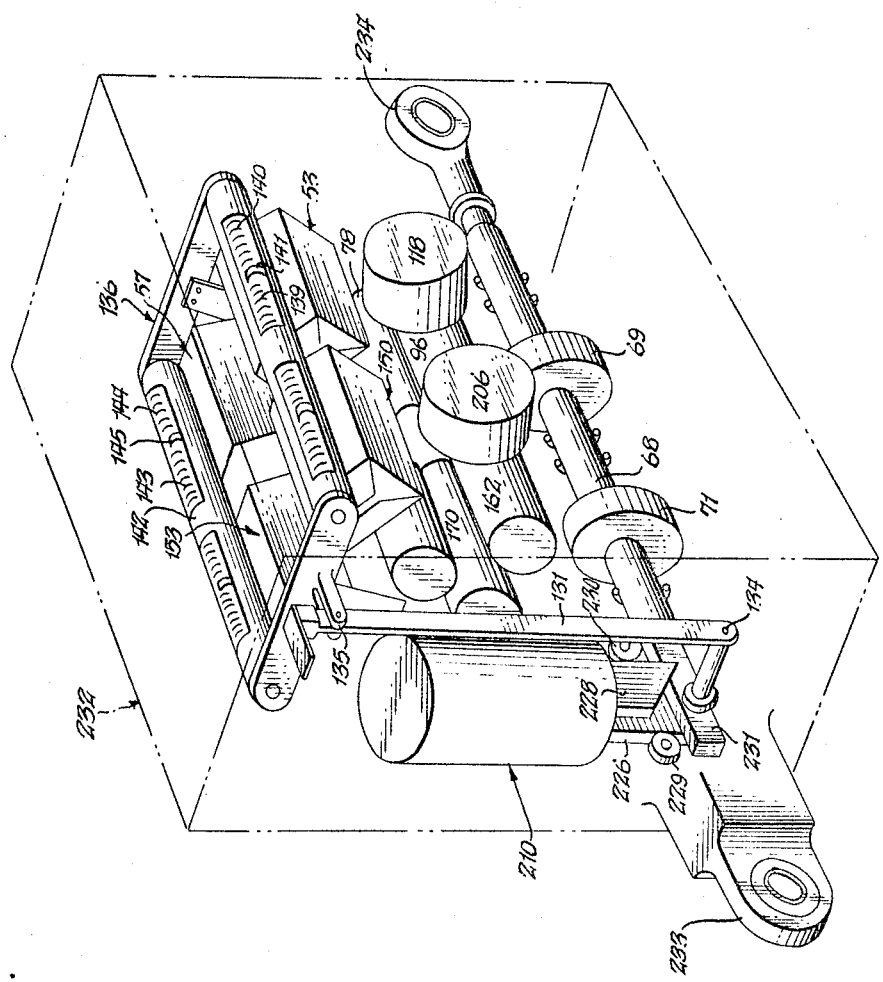
FIG. 1 is a perspective phantom and schematic view of a redundant servomechanism constructed in accordance with the principles of the present invention.

In accordance with the principles of the present invention a redundant fluid powered servoactuator is provided such as shown in FIG. 1 which will fail operative for any initial failure and will fail safe for any second failure. This is accomplished by providing a tandem actuator having essentially identical control and failure-detection mechanism associated with each actuator piston. Each of the two halves of the unit operate independently from one of two available fluid pressure supplies. Thus, if the initial failure is loss of one pressure supply, the remaining operative portion of the actuator will contain its own failure-detection mechanism to permit center locking of the actuator piston rod in the event of a second failure.

Before describing the details of the unit, it is deemed desirable to describe the monitor concept by itself. For this purpose, reference is made to FIG. 10. There in block diagram form the components of a well known servovalve having a motor such as a torque motor, fluid amplifier and valve spool with mechanical feedback $K_{sf}$ to the summing point of the fluid amplifier. These components are arranged within an upper dashed line rectangle designated "servovalve." The lower portion of the diagram shows the auxiliary components added to provide monitoring and these components are arranged in a lower dashed line rectangle designated "monitor." These auxiliary components include a second motor such as a torque motor associated with a second fluid amplifier and mechanical feedback $K_{sf}$ from the valve spool to the summing point of the monitor fluid amplifier. Actuator displacement feedback is shown as leading to the summing points of the valve and monitor fluid amplifiers.

The valve fluid amplifier produces a spool-driving pressure such as a differential pressure that is proportional to the combination of motor torque and actuator position feedback torque minus a torque, proportional to spool position, which is produced by a feedback spring. This differential pressure is normally quite small since it represents only that which is necessary to overcome spool friction and to drive the spool against the low stiffness of the feedback spring.

The secondary or monitor fluid amplifier also produces a pressure such as a differential pressure and is arranged to have its associated feedback spring also moved by the valve spool. Since the monitor receives an identical command signal to its torque motor as that to the primary or valve torque motor and an identical actuator position feedback torque, it will tend to produce essentially the same differential pressure $\Delta P_m$. This pressure is not applied to the drive spool, but instead is brought out as an indication of failure and leads to some suitable detector device. The displacement of the valve spool controls the flow of fluid Q to an actuator.

With greater particularity and still referring to FIG. 10, the servovalve portion of the mechanism normally acts to produce a feedback torque $T_{sv}$ which is proportional to spool position $X_s$ and equal to the motor torque $T_v$ minus the actuator torque $T_{av}$. An identical feedback torque $T_{sm}$ is compared to the identical motor torque $T_m$ minus the same actuator torque $T_{am}$ in the monitor section. In normal operation there will be no difference in torque and hence no output pressure, $\Delta P_m$, from the monitor hydraulic amplifier.

However, if the actual spool position $X_s$ does not agree with the desired position indicated by $T_m$ minus $T_{am}$, there will be a proportional output of $\Delta P_m$. A failure of any of the elements in either the servovalve or monitor sections will therefore be indicated.

It is not practical to provide exact tracking of the servovalve and monitor due to differential thermal drift and necessary tolerances of element gains. It is thus necessary that the $\Delta P_m$ sensor be an absolute valve device with a finite threshold below which pressure inputs are ignored. Pressure levels in excess of this threshold constitute an indication of failure and should cause corrective action.

Figure 2:
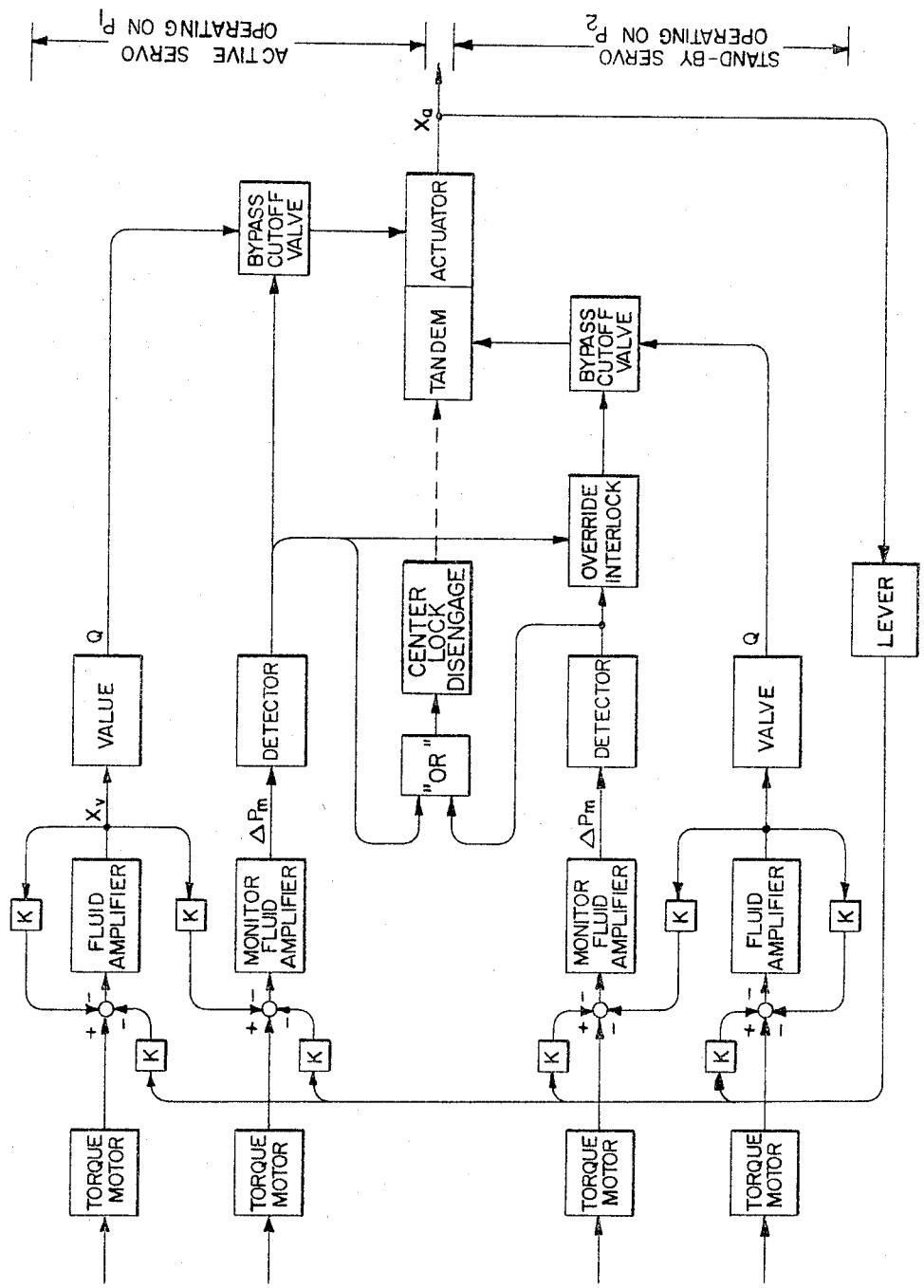
FIG. 2 is a block diagram of the servomechanism shown in FIG. 1.

Reference is now made to FIG. 2 which shows the complete redundant actuator unit in block diagram form. The basic approach is to provide one active servo and one standby servo, since this is considerably simpler to mechanize than a system which provides two servos operating simultaneously. The standby servo and its associated monitor are pressurized at all times, although the servovalve output is not connected to its piston. This permits any failure in the standby channel to be detected in the same manner as failure in the active channel. A failure in the active channel would, of course, result in switchover to the standby system, whereas an initial failure in the standby system would result merely in prevention of switchover. In either case an appropriate warning indication may be provided.

Figure 3:
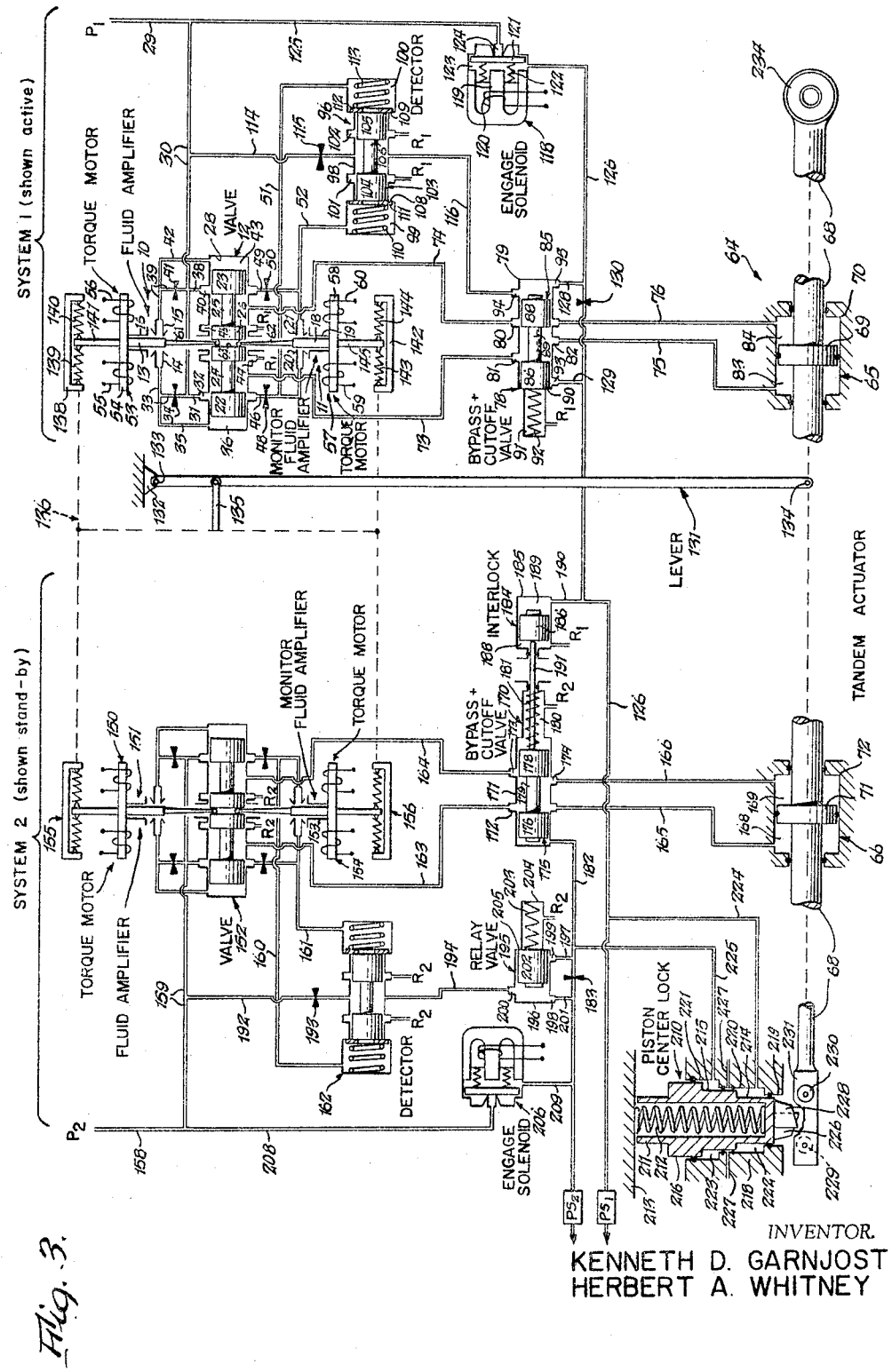
FIG. 3 is a fluid circuit diagram of the servomechanism shown in FIGS. 1 and 2.

The actual mechanism corresponding to FIG. 2 and also in part to FIG. 10 is shown in FIG. 3 and will now be described. Referring to FIG. 3, the fluid powered servomechanism is shown as comprising two systems, one in an active condition and the other in a standby condition. The active system shown at the right in FIG. 3 comprises a first fluid amplifier indicated generally at 10, a monitor fluid amplifier indicated generally at 11, and a movable flow control member indicated generally at 12. Fluid amplifier 10 and member 12 comprise the input and output stages of servovalve means. More specifically, the fluid amplifier 10 is shown as comprising a movable member such as a pivotal pressure regulating member or flapper 13 having a free end portion arranged between a pair of fixed, spaced apart and oppositely facing nozzles 14 and 15. The flapper 13 is carried on a flexure tube 16 and it is the bending of this tube which provides pivotal movement for the flapper.

The monitor fluid amplifier 11 is also shown as comprising a movable member such as a pivotal pressure regulating member or flapper 18 supported on a flexure tube 19. The free end of this flapper 18 is shown as arranged movably between a pair of fixed, oppositely facing and spaced apart nozzles 20 and 21.

The flow control member 12 is shown as being in the form of a valve spool comprising end lobes 22 and 23 connected by rods 24 and 25, respectively, of reduced diameter to a center lobe 26. The valve spool 12 is slidably arranged in a cylindrical compartment 28 having ports associated with fluid supplies and drains as hereinafter explained.

Active system 1 is shown as operated on a pressurized fluid supply $P_1$ which is furnished through a main conduit 29 from which extends a branch conduit 30. This branch conduit 30 terminates in a first lateral branch conduit 31 leading to an annular port 32 adjacent the inner end face of left end lobe 22 of valve spool 12. A second lateral branch conduit 33 connects conduit 30 to left nozzle 14 and has a fluid restrictor 34 arranged therein. Another branch conduit 35 is connected with conduit 33 intermediate restrictor 34 and left nozzle 14 and leads to a left spool end chamber 36 provided between the left end wall of valve chamber 28 and the opposing and outer end face of left valve end lobe 22.

Conduit 30 has another pair of lateral branch conduits 38 and 39. Conduit 38 leads to an annular port 40 adjacent the inner end face of right end lobe 23 of valve spool 12. The other lateral branch conduit 39 has a fluid restrictor 41 therein and leads to right nozzle 15. Another branch conduit 42 connects with conduit 39 intermediate the restrictor 41 and nozzle 15 and leads to a right spool end chamber 43 provided between the right end wall of valve chamber 28 and the opposing and outer end face of right valve lobe 23.

Two annular return ports 44 and 45 are arranged respectively at the left and right end faces of center lobe 26 of valve spool 12 and are in suitable fluid conducting communication with a drain or return designated $R_1$ which is the common return for the fluid supply $P_1$ associated with the active system being described.

Considering now the fluid supply for nozzles 20 and 21 of monitor fluid amplifier 11, a conduit 46 is shown as establishing fluid conducting communication between left annular port 32 and left nozzle 20. A fluid restrictor 48 is arranged in this conduit 46. A similar conduit 49 having a fluid restrictor 50 therein establishes fluid conducting communication between right annular port 40 and right nozzle 21.

A first monitor pressure sensing conduit 51 communicates with conduit 46 at a place intermediate restrictor 48 and left nozzle 20. A similar monitor pressure sensing conduit 52 connects with conduit 49 intermediate restrictor 50 and right nozzle 21.

Any suitable means may be provided for impressing similar command input signals upon the flappers 13 and 18. As shown such means comprises a motor such as an electrically controlled torque motor associated with each flapper, that associated with flapper 13 being designated 53 generally and that associated with flapper 18 being designated 57 generally. The torque motor 53 is shown as comprising an armature 54 which is in the form of a bar extending perpendicularly to flapper 13 and rigidly connected at its center to that end of this flapper remote from the nozzles 14 and 15. A left coil 55 surrounds the left portion of the armature 54 and a similar coil 56 surrounds the right portion of this armature. Referring to the torque motor 57, the same also includes a similar armature 58 and left and right coils 59 and 60, respectively.

The armature coils 55, 56 and 59, 60 are associated in a well-known manner so that each receives the same electrical command input signal. Such a signal will cause the armature-flapper member 54, 13 to pivot as permitted by flexure tube 16 to cause flapper 13 to move closer to one of the nozzles 14 or 15 and differentially farther away from the other, thus producing a differential pressure which is applied to the ends of valve spool 12 through the connected passages 33, 35 and 36 for the left side of the valve spool and through the connected passages 39, 42 and 43 for the right side of the valve spool. When the same electrical command input signal is applied to armature coils 59, 60 of torque motor 57, the armature-flapper member 58, 18 is caused to pivot as permitted by the flexure tube 19 to move one end of flapper 18 closer to one of nozzles 20 or 21 and differentially farther away from the other, thereby to create a monitoring differential pressure in conduits 51, 52.

Mechanical force feedback means are shown as being operatively interposed between valve spool 12 and each of flappers 13 and 18. As shown, such means comprises a feedback spring member 61 cantilever-mounted to one end of the flapper 13 and having its other end constrained to move with the valve spool as the latter slides axially in its chamber 28. A similar feedback spring member 62 is cantiliver-mounted at one end on the end of flapper 18 and the other end of this member is constrained to move with valve spool 12. As shown, these feedback spring members 61 and 62 have spherical enlargements at their end adapted to roll on the wall surfaces of an annular groove 63 provided in spool center lobe 26. A more complete description of the structure and operation of such a mechanical force feedback spding member may be found in United States Patent No. 3,023,782.

The servovalve means constituted by the torque motor 53, fluid amplifier 10 and valve spool 12 control the flow of fluid with respect to tandem actuator means indicated generally at 64. This tandem actuator means has two portions shown generally at 65 and 66, and comprises a piston rod 68 having a first piston 69 slidably arranged in a cylinder 70 and a second piston 71 axially spaced from the first piston 69 and slidably arranged in a second cylinder 72. The servovalve means referred to is normally associated operatively with right actuator portion 65. This association is provided by a first pair of actuator conduits 73, 74, a second pair of actuator conduits 75, 76, and a bypass and cutoff valve means generally designated 78 interposed between such pairs.

More specifically, the bypass and cutoff valve means 78 which in FIG. 3 is shown in an inoperative condition comprises a cylinder 79 having an annular port 80 to which the opposing ends of conduits 74 and 76 are connected, and two axially spaced or offset ports 81 and 82, the opposing ends of conduits 73 and 75 being connected to these ports 81 and 82, respectively. The remote end of conduit 73 is connected to valve chamber 28 intermediate left ports 32 and 44 therein, and the corresponding end of the companion conduit 74 is connected to valve chamber 28 intermediate right ports 40 and 45. The remote end of conduit 75 is connected to a chamber 83 on the left side of actuator piston 69, and the corresponding end of the companion line 76 is connected to a chamber 84 on the right side of this piston.

The valve means 78 also includes a slide 85 comprising left and right end lobes 86 and 88, respectively, connected by an intermediate rod portion 89 of reduced diameter. This valve slide 85 is slidably arranged in cylinder 79. As shown, valve slide 85 is in its leftward position in which the outer end face of left lobe 86 bears against an annular shoulder 90 which surrounds a coaxial recess 91 in which a preloaded compression spring 92 is housed. The interior of recess 91 is shown as being connected to the common return $R_1$. When in this leftward position of the valve slide 85, its left lobe 86 covers a left port 93, and its right lobe 88 covers annular port 80 and blocks communication between it and either of ports 81 and 82. To the right of right lobe 88 is shown an inner port 94 and an outer port 95, these ports being axially spaced from each other.

Referring to FIG. 3, it will be seen that ports 81 and 82 are in communication with each other but blocked from communication with annular uport 80, the latter establishing fluid conducting communication between the actuator conduits 74 and 76. The connected ports 81 and 82 establish fluid conducting communication between actuator conduits 73 and 75. In this manner, valve spool 12 controls the flow of fluid with respect to actuator chambers 83 and 84 on opposite sides of right actuator piston 69.

Detector means indicated generally at 96 are operatively associated with monitoring differential pressure conduits 51 and 52. Such detector means 96 are shown as comprising a cylinder 98 having an intermediate chamber portion of reduced diameter and enlarged end portions to provide left and right end chambers 99 and 100, respectively. Conduit 52 is in fluid conducting communication with left end chamber 99 and conduit 51 similarly connects with right end chamber 100.

The intermediate portion of cylinder 98 is shown as having a pair of axially spaced annular ports 101 and 102 severally connected to the common return $R_1$. Slidably arranged within the cylinder 98 is a detector valve spool disignated generally at 103 and comprising left and right end lobes 104 and 105, respectively, connected by an intermediate rod 106 of reduced diameter. The overall axial length of detector valve spool 103 is approximately the same as the axial spacing between the outwardly facing left and right annular shoulders 108 and 109, respectively, formed by the change in diameter between the radially enlarged end chambers 99, 100 and the radially smaller intermediate cylinder portion. The spacing between the inner and opposing end faces of lobes 104 and 105 corresponds generally to the axial spacing between the adjacent inner annular edges of ports 101 and 102 so that when the detector valve slide 103 is in the position shown in FIG. 3 these ports 101, 102 are closed by end lobes 104, 105, respectively.

Urged against left shoulder 108 by a helical compression spring 110 is an abutment member 111 in the form of a flat ring. A similar ring-like member 112 is held against right shoulder 109 by a helical compression spring 113.

A branch conduit 114 connects conduit 30 with the interior of cylinder 98 intermediate annular ports 101, 102. A fluid restrictor 115 is arranged in this conduit 114. Another conduit 116 is connected to the interior of the cylinder 98 intermediate annular ports 101, 102 diametrically opposite the end of conduit 114 and at its opposite end connects with port 94 of the bypass and cutoff valve means 78.

Means are provided for assuring that the bypass and cutoff valve means 78 is in its inoperative condition when there is no failure in system 1, i.e. the valve slide 85 is in its farthest left position as shown in FIG. 3. For this purpose, engage solenoid means indicated generally at 118 are provided. Such solenoid means 118 are shown as comprising a core element 119 having a portion surrounded by a coil 120 adapted to be energized selectively. When energized, an armature 121 is attracted toward the core element 119 against the urging of a spring 122 interposed therebetween. In the position shown in FIG. 3, the engage solenoid 118 is deenergized so that spring 122 urges the armature 121 to a rightward position. The armature member 121 is movably arranged in a chamber 123 the outer end wall of which is formed to provide a nozzle 124. Spring 122 urges the armature member 121 against the tip of nozzle 124 thereby closing the orifice of this nozzle. The nozzle 124 is shown in fluid conducting communication with main pressure supply conduit 29 by an inlet conduit 125. Another conduit 126 is shown as connected to solenoid chamber 123 at a location in the side wall thereof axially remote from the tip of nozzle 124. A branch conduit 128 is shown as connecting right outer port 95 of the bypass and cutoff valve means 78 with this conduit 126. A similar branch conduit 129 connects left port 93 with conduit 126. A fluid restrictor 130 is shown as arranged in conduit 126 intermediate branch conduits 128 and 129. Conduit 126 is shown as leading to a pressure switch $PS_1$ arranged to control the illumination of a signal lamp or other suitable indicator (not shown).

Mechanical force feedback means are shown as being operatively interposed between the tandem actuator 64 and the armature-flapper member 54, 13 and the armature-flapper member 58, 18. While such means may be variously constructed, the same is shown as comprising a lever 131 pivotally mounted on a suitable support member 132 to move about a pivotal axis 133. The remote end of the lever 131 is suitably connected to the piston rod 68 of the tandem actuator 64 so as to be pivotal about an axis indicated at 134. Intermediate its ends but closer to its pivotal axis 133, the lever 131 is shown as being pivotally connected to an arm 135 of a movable rigid structure indicated generally at 136. This structure 136 is shown as including a first cage 138 housing a pair of alined feedback coil springs 139 and 140 arranged on opposite sides of an arm 141 which is an axial extension of flapper 13 and arranged on the opposite side of armature 54. The inner and opposing ends of feedback springs 139, 140 bear against opposite sides of this arm 141, and the outer ends of these springs bear against abutment surfaces suitably formed on cage 138. The rigid structure 136 also includes another cage 142 housing a pair of feedback coil-springs 143 and 144 bearing on opposite sides of an extension arm 145 for the armature-flapper member 58, 18.

The foregoing completes the structural description of system 1 or the active channel illustrated in FIG. 3. System 2 shown in a standby condition in FIG. 3 will now be described.

The standby channel is shown as comprising servovalve means including input stage means and output stage means, and also a monitor fluid amplifier with associated torque motor, which are the counterparts of the similar elements described in detail in connection with the active channel or system 1. In view of their similarity, the corresponding components will not be redescribed in detail but indicated only generally by reference numerals, unless a departure in structure occurs which will be described. Thus, standby system 2 comprises a torque motor 150, an associated fluid amplifier 151, a valve spool 152, a monitor fluid amplifier 153 and an associated torque motor 154. The flappers of fluid amplifiers 151 and 153 severally have extension arms which are connected by feedback springs to feedback structure 136. A feedback mechanism indicated generally at 155 corresponds to the detailed structure 138–141 previously described. Also, a feedback mechanism indicated generally at 156 corresponds to the detailed feedback mechanism 142–145 previously described.

System 2 is operated on a separate pressurized fluid supply designated $P_2$ furnished through main conduit 158 having a branch 159 which corresponds to branch conduit 30 in system 1. The monitoring differential pressure developed by monitor fluid amplifier 153 is applied through conduits 160 and 161 to the opposite end chambers of detector means indicator generally at 162 which correspond in detailed construction to detector means 96 of system 1. The only difference is that the annular ports of detector means 162 are associated with a separate return designated $R_2$ with which the drain ports of the cylinder for the valve spool 152 are also associated.

The valve means including valve spool 152 of system 2 controls the flow of fluid through a pair of actuator conduits 163 and 164 which correspond to conduits 73, 74 of system 1. A second pair of actuator conduits 165 and 166 are provided and these correspond to conduits 75, 76 of system 1. Conduit 165 leads to an actuator chamber 168 on the left side of left actuator piston 71, and conduit 166 leads to actuator chamber 169 on the right side of this piston.

The opposing ends of the actuator conduits 163–166 are connected to a bypass and cutoff valve means designated generally at 170 which will now be described. Such valve means 170 is shown as comprising a cylinder 171 having an annular port 172 and axially offset additional ports 173 and 174. Conduits 163 and 165 are shown as connected to annular port 172 at diametrically opposed locations. Conduit 164 communicates with port 173, and conduit 166 communicates with port 174. Slidably arranged in cylinder 171 is a valve spool designated generally at 175 which is shown as comprising left and right end lobes 176 and 178, respectively, connected by an intermediate rod 179 of reduced diameter. The axial spacing between ports 172–174 and lobes 176, 178 is such that when valve slide 175 is in its operative position as shown in FIG. 3, annular port 172 is placed in fluid conducting communication with port 174, whereas right lobe 178 blocks port 173.

Cylinder 171 is shown as having a coaxial recess 180 in its right end which houses a helical compression spring 181 and is shown as connected to the common fluid return $R_2$. This spring is preloaded so as to urge the valve slide 175 to its leftward and cutoff position shown in FIG. 3. The chamber to the left of left lobe 176 is shown as communicating with a conduit 182 having a fluid restrictor 183 therein and leading to a pressure switch $PS_2$ which is adapted to control the operation of a signal indicator (not shown).

Interlock means are shown as being operatively interposed between the bypass and cutoff valve means 78 and 170 of the two systems. Such interlock means designated generally at 184 is shown as comprising a cylinder 185 in which a piston 186 is slidably arranged so as to provide left and right chambers 188 and 189, respectively. Right chamber 189 is shown as connected in fluid conducting communication with conduit 126 via a branch conduit 190. Left chamber 188 is shown as communicating with common fluid return $R_1$. The opposing end walls of cylinders 171 and 185 which are arranged coaxially are shown as having openings therein through which a push rod 191 slidably and sealingly extends. The right end of this push rod bears against interlock piston 186, and its left end bears against right lobe 178 of the bypass and cutoff valve slide 175.

The upstream side of detector means 162 is shown as communicating with branch conduit 159 through a lateral branch conduit 192 having a fluid resistor 193 therein. This conduit 192 with restrictor 193 corresponds to conduit 114 and restrictor 115 of system 1. The downstream side of detector means 162 is shown as connected in fluid conducting communication via a conduit 194 with relay valve means indicated generally at 195. Such means 195 are shown as comprising a cylinder 196 having axially spaced ports including left end port 198, right end port 199 and intermediate port 200. Conduit 194 communicates with port 200. Port 198 communicates via branch conduit 201 with conduit 182. Port 199 communicates via branch conduit 197 with conduit 182. Restrictor 183 which is in conduit 182 is arranged intermediate branch conduits 197 and 201.

The relay valve means 195 also includes a piston 202 slidably arranged in cylinder 196. This piston is constantly urged to the left by a helical compression spring 203 housed in a chamber 204 forming a coaxial extension of cylinder 196. Chamber 204 is shown as communicating with fluid return $R_2$. The extreme rightward position of piston 202 shown in FIG. 3 is limited by an annular stop surface or shoulder 205 formed in the cylinder 196 at the mouth of chamber 204. When piston 202 is against this shoulder 205, the piston closes off port 199 but leaves ports 198 and 200 uncovered so as to establish communication therebetween.

Engage solenoid means indicated generally at 206, and similar in construction and operation to engage solenoid means 118 for system 1, are shown as interposed between main supply conduit 158 and conduit 182. For this purpose, the inlet nozzle of solenoid means 206 is connected via branch conduit 208 to main supply conduit 158, and the outlet of such solenoid means is connected via branch conduit 209 to conduit 182.

Means are provided to prevent the operation of tandem actuator 64 in the event that there is a failure in both systems 1 and system 2. While such means may be variously constructed, the same is shown as piston center lock means indicated generally at 210. Such piston center lock means 210 are shown as comprising a cup-shaped piston 211 housing a helical compression spring 212 which is shown as bearing at its lower end against the closed lower end of piston 211 and at its upper end against a suitable back support 213. The exterior of piston 211 is shown as having a stepped annular configuration including a lower peripheral surface 214, an intermediate peripheral surface 215 of larger diameter, and an upper peripheral surfaces 216 of still larger diameter. Piston 211 is slidably arranged in a cylinder member 218 having a stepped cylindrical bore including a lower portion 219, an intermediate portion 220 of larger diameter and an upper portion 221 of still larger diameter. Lower peripheral piston surface 214 is slidably received in lower bore portion 219, middle peripheral piston portion 215 is slidably received in middle bore portion 220, and upper peripheral piston portion 216 is slidably received in upper bore portion 221. This arrangement provides a lower piston chamber 222 and an upper piston chamber 223. Lower piston chamber 222 is shown as communicating via a branch conduit 224 with conduit 126. Upper piston chamber 223 is shown as communicating via a conduit 225 with conduit 182. Suitable annular seal means such as O-rings are interposed between opposing cylindrical surfaces to prevent axial linkage from between these chambers 220 and 223. Intermediate piston chambers 222, 223 supplied by separate fluid systems, double O ring seals with intermediate vent are provided. Such vent passages are shown at 227.

The piston center lock means 210 is also shown as including a pair of laterally spaced downwardly extending salient members 226 and 228 having inclined cam surfaces adapted to engage spaced rollers 229 and 230, respectively. These rollers 229, 230 are carried on an extension 231 of the piston rod 68 for the tandem actuator 64. This extension 231 is shown as flat-sided and adapted to be straddled by the piston extensions 226, 228. The rollers 229, 230 are on opposite sides of this flat piston rod extension 231. A cam surface on piston extension 226 is adapted to engage roller 229 and a cam surface on piston extension 228 is adapted to engage roller 230, as shown in FIG. 9. In FIG. 3, the piston center lock means 210 is shown in a retracted inoperative position.

OPERATION

The torque motor 53, fluid amplifier 10 and valve spool 12 comprise a mechanical feedback type servovalve such as is more fully described in said United States Patent No. 3,023,782. Added to such a servovalve are the monitor means comprising the torque motor 57, monitor fluid amplifier 11 and feedback spring member 62.

The servovalve section develops a differential pressure in conduits 73, 74 which is utilized to control the operation of right actuator piston 69, as explained more fully hereinafter. The output of the monitor means is a monitoring differential pressure which is a measure of the different between the force exerted by the servovalve feedback spring member 61 and the output of monitor torque motor 57 as sensed by the force exerted by the monitor feedback spring member 62.

As previously explained, the same electrical command input signal is applied to all torque motors 53, 57, 150 and 154.

Before fluid supply pressures $P_1$ and $P_2$ are applied valve slide 85 of bypass and cutoff valve means 78 of active system 1 will be in its operative position shown in FIG. 6 in which the two ports 80 and 82 connected to opposite sides of right actuator piston 69 are connected together so that pressures on opposite sides of this piston are equal. The valve slide 85 is maintained in this rightward position shown in FIG. 6 by the spring 92. Referring to standby system 2, before supply pressure $P_2$ is applied, piston 202 of relay valve means 195 will be in its off position shown in the bottom portion of FIG. 7 in which position piston 202 blocks port 200 and prevents this port from communicating with port 198.

In this preliminary condition of the systems before the supply pressures are applied, the bypass and cutoff valve means 170 of standby system 2 will be in the operative condition as shown in FIG. 3. The interlock means 184 will also be in the position shown in FIG. 3. As well, the de-energized engage solenoid means 118, 206 will be in their respective de-energized or nozzle-closed conditions shown in FIG. 3. The piston center lock means 210 will be in its locked poistion shown in FIG. 9 in which the piston extensions 226, 228 are projected into engagement with the abutment rollers 229, 230 respectively. The detector means 96 and 162 will be in their respective poistions shown in FIG. 3.

Assume now that the supply pressures $P_1$ and $P_2$ are applied by some suitable valve means (not shown).

While such application of supply pressures will make pressurized fluid available to the fluid amplifiers of the servovalve and monitor of both systems 1 and 2, bypass and cutoff valve means 78 will remain in its cut off condition shown in FIG. 6 inasmuch as right lobe 88 of valve slide 85 is closing off port 94. Relay valve means 195 will also remain in its operative position shown in FIG. 7 since piston 202 is closing off port 200. The piston center lock means 210 will remain in its lock position shown in FIG. 9 inasmuch as no pressurized fluid is being admitted through either conduit 224 or 225.

The engage solenoid means 118 and 206 are now energized momentarily and preferably substantially simultaneously. This is accomplished by any suitable manner such as by the manual depression of switches arranged in the circuits for the coils of these solenoids. Considering engage solenoid means 118, when it is momentarily energized, its armature 121 will be drawn away from its position closing nozzle 124 shown in FIG. 3 to an open position such as shown in FIG. 5 in which communication is established between the orifice of nozzle 124 and conduit 126. Through this conduit and connected conduit 128, pressurized fluid is admitted to the chamber to the right of right end lobe 88 of valve slide 85 of the bypass and cutoff valve means 78. This will drive valve slide 85 from the position shown in FIG. 6 to the left against shoulder 90 and against the urging of spring 92 and will be held in this position as depicted in FIG. 3 by reason of uncovering the pressure port 94 at the right end of this valve slide. Thus, when the energization of solenoid means 118 terminates, valve means 78 will still remain in its inoperative position depicted in FIG. 3 since ports 94 and 95 are now in communication with each other and connected to a source of pressurized fluid $P_1$. The channel for such connection comprises the conduit 116, the annular space surrounding rod 106 of the detector means 96, and conduits 114 and 30.

With the valve means 78 being in its inoperative condition as shown in FIG. 3, ports 81 and 82 are connected so that actuating conduits 73 and 75 are in communication with each other. Since port 80 is annular, the companion actuating conduits 74, 76 are always in communication with each other. Right lobe 88 now isolates port 80 from communication with either of ports 81 and 82.

Inasmuch as conduit 128 leading from port 95 of the bypass and cutoff means 78 is now under pressure, so is conduit 126 which applies the pressure through branch conduit 190 to right chamber 189 of interlock means 184. Inasmuch as left chamber 188 of such means is connected to return $R_1$, interlock piston 186 is urged to and maintained in its left position depicted in FIG. 3. Due to the urging of such piston 184 as transmitted through the push rod 191, coupled with the urging of spring 181, the bypass and cutoff valve means 170 will remain in its operative position depicted in FIG. 3 in which position ports 173 and 174 are cut off from communicating with each other by right lobe 178 covering port 173. At the same time port 174 and annular port 172 are in communication with each other so that a pressure differential cannot be built up across the left actuator piston 71.

Inasmuch as conduit 126 is now pressurized, fluid under pressure will be conducted through branch conduit 224 to lower piston chamber 222. The presence of pressurized fluid within this chamber 222 is sufficient to force the piston 211 upwardly from its operative locked position shown in FIG. 9 to its retracted inoperative position depicted in FIG. 3.

Pressure switch $PS_1$ will also be operated by the pressurized fluid in conduit 126.

When engaged solenoid 206 for the standby system is energized momentarily, solenoid 206 will operate to momentarily establish communication between conduits 208 and 209. As soon as this occurs, the pressure of pressurized fluid in conduit 182 is transmitted through branch conduit 201 to port 198 and thereby apply pressurized fluid to the left end face of relay piston 202. This pressurized fluid will drive this piston 202 from its off position shown in FIG. 7 to the right to its on position shown in FIG. 3. This uncovers port 200 and places it in communication with port 198. Establishing communication between ports 198 and 200 will maintain conduit 182 under pressure even though the inlet nozzle of engage solenoid means 206 recloses. Port 200 is maintained pressurized by reason of connection of conduits 194, 192, 159 and 158. Since conduit 182 is pressurized, this pressure will be transmitted through conduit 225 to upper piston chamber 223. Also, the presence of pressurized fluid in conduit 182 will operate pressure switch $PS_2$.

With pressurized fluid in right interlock chamber 189 and in conduit 182 leading to the left end face of left lobe 176 of valve slide 175 of the bypass and cutoff valve means 170, this valve slide 175 will not shift to the right away from its operative position depicted in FIG. 3. This is due to the urging of spring 181.

From the foregoing, it will be seen that system 1 is in an active condition controlling the operation of actuator portion 65, whereas system 2 is in a standby condition disassociated operatively with the other portion 66 of tandem actuator 64. Piston rod 68 of the actuator is free to move axially inasmuch as the center lock piston 211 is held in a retracted inoperative position.

Assuming that a failure occurs in system 1 which may be a failure of pressure $P_1$ or the plugging of a restrictor 34, 41, 48 or 50, or the failure of one of the motor coils 55, 56, 59 or 60, the effect will be to disengage system 1 with actuator portion 65 and engage system 2 with actuator portion 66 assuming system 2 itself does not have a failure.

Detection of a failure in active system 1 will result in the application of a monitoring differential pressure to the ends of detector valve slide 103. This valve slide is preloaded in its center position shown in FIG. 3 by an amount corresponding to an appropriate error threshold. Application of a pressure exceeding this preload will cause this detector valve slide 103 to move off center and vent the pressure holding the valve slide 85 of the bypass and cutoff valve means 78. A displaced condition of the detector valve slide 103 is depicted in FIG. 4 in which this valve slide is shown displaced to the left so as to have moved away from the right abutment ring 112 and has lifted left abutment ring 111 off left shoulder 108 against the urging of left spring 110. In such leftward displacement of detector valve slide 103, pressurized conduit 114 is placed in fluid conducting communication with the annular port 101 which is connected to fluid return $R_1$. Flow from the source of pressurized fluid is restricted by reason of the presence of the restrictor 115 in conduit 114. Also, conduit 116 is placed in fluid conducting communication with return port 101 and this relieves the pressure in the chamber at the right end of valve slide 85, thereby permitting spring 92 to expand and drive this valve slide from its inoperative condition shown in FIG. 3 to its operative condition shown in FIG. 6. In this operative condition, left lobe 86 covers port 81 and cuts off communication between this port and port 82. In this manner the servovalve of system 1 is cut off from operative association with portion 65 of the tandem actuator 64.

Once the valve slide 85 has moved to its operative condition shown in FIG. 6, port 94 communicating with the detector valve means 96 is closed. Thus the detector valve slide 103 can return to its centered position without re-engaging the servovalve.

At the time that port 94 is closed by the rightward movement of valve slide 85, pressure is removed from connected conduits 128, 126 and 190 and hence is removed from right chamber 189 of the interlock means 184. Inasmuch as at this time pressurized fluid is bearing against the left end face of valve slide 175 of the standby bypass and cutoff valve means 170 and the force created thereby is sufficient to overcome that exerted by spring 181, this valve slide 175 will shift from its leftward position shown in FIG. 3 to its rightward position shown in FIG. 8. During such rightward movement, the push rod 191 will shift interlock piston 186 to the right as is also depicted in FIG. 8. Rightward movement of valve slide 175 causes its right lobe 178 to uncover port 173, thereby placing this port in communication with port 174. In this manner actuator conduits 164 and 166 are placed in fluid conducting communication with each other and the standby servovalve will now have a direct connection with right actuator chamber 169. Left actuator chamber 168 already has a direct connection since port 172 is annular and at all times maintains actuator conduits 163 and 165 in communication with each other. It will thus be seen that standby system 2 will be operatively associated to its actuator portion 66 at the same time that initially active system 1 became disassociated operatively with its actuator portion 65.

In the assumed example, even though the pressure in conduit 126 disappears and hence the pressure in piston chamber 222 of the piston center lock means 210, the presence of pressurized fluid in upper piston chamber 223 by reason of connection through conduit 225 with conduit 182 which is now filled with pressurized fluid, will be adequate to maintain the piston 211 in a retracted inoperative position. In other words, only one pressure in either piston chamber 222 or 223 is necessary to keep the piston center lock means 210 unlocked. In the event of the loss of both pressures, the piston 211 will be driven into its locked position as shown in FIG. 9 by expansion of spring 212. The cam surfaces of the piston extensions 226, 228 will cooperate with the rollers 229, 230, respectively, to center the actuator piston rod 68 and lock this piston rod in this centered position.

In the foregoing changeover from system 1 to system 2, it was assumed that there was no failure present in system 2 at the time. If there had been, system 2 would not have become effective for the following reasons. If there had been a failure in system 2 such as in one of the coils of the torque motors 150, 154 or a plugged nozzle in one of the fluid amplifiers 151, 153, or in one of the fluid restrictors associated therewith, a monitoring differential pressure above a predetermined level would have developed in conduits 160, 161 and been applied to the detector 162. Since this monitoring differential pressure would have been above the error threshold permitted by this detector 162, its valve slide would have shifted either to the left or to the right to uncover one of the annular return ports. This would connect conduit 194 leading from the relay valve means 195 with fluid return $R_2$. This would have taken the fluid pressure off the left end face of relay valve piston 202, permitting spring 203 to expand and shift this piston from the position shown in FIG. 3 to the position shown in the lower portion of FIG. 7. Such leftward displacement of relay valve piston 202 would cover port 200 and uncover port 199. Port 199 through chamber 204 will now be in communication with fluid return $R_2$. In turn, so will conduits 197 and 182. Removing pressure from conduit 182 will take the pressure off the left end face of left lobe 176 of valve slide 175 of bypass and cutoff valve means 170. Spring 181 will then maintain this valve slide 175 in the left displaced position shown in FIG. 3 in which position ports 173 and 174 are disconnected, whereas ports 172 and 174 are connected. Accordingly, system 2 could not have become operatively associated with actuator portion 66.

The failure in system 2 just described can also occur after system 2 has become active. The result will be a shifting of the valve slide 175 from the inoperative position depicted in FIG. 8 to the operative position shown in FIG. 3, thereby disassociating the servo valve of system 2 with actuator portion 66.

Failure of the pressure in either conduit 126 or 182 will cause the respective switch $PS_1$ or $PS_2$ to control the indicator (not shown).

It will be seen that system 2 is essentially identical to system 1 with the exception of the relay valve means 195 which separates from bypass and cutoff valve means 170 the functions performed by the ports 94, 95 at the ends of bypass and cutoff valve means 78 of system 1. This is necessitated by the override action of the interlock means 184.

The various components diagrammed in FIG. 3 may be assembled in a compact mechanism depicted schematically in FIG. 1 in which the components are housed within a casing 232 having a laterally extending attaching eye 233 projecting from one side and the actuator piston rod 68 projects through a suitable opening provided in the opposite side of the casing and having an attaching eye 234 on the outer extremity of this rod.

It will be appreciated that operation of the servovalve is being monitored by comparing such operation to an indication of the desired valve operation and since the frequency response of the servovalve is not perfect and there is also a limitation on the extent of displacement of the valve spool, there can be developed under some circumstances a monitoring pressure which is above its threshold level so as to indicate failure when there is actually none. For example, if the valve spool 12 is driven against either end wall of valve chamber 28 and hence cannot reach the displacement apparent commanded, an apparent failure would be indicated. However, this can be overcome by limiting the electrical command input signal to the torque motors of the active and standby servovalves and monitors, the input to these motors will not saturate under normal conditions to give a false indication of failure by developing a monitoring differential pressure in excess of the error threshold allowed by the detector means 96 and 162.

FIGS. 11–13

If it is not practical to limit the command signal as considered hereinabove, a false indication of failure can be prevented by the provision of other mechanism such as shown in FIGS. 11–13. The feature of the mechanism there shown is that it develops the same imperfections in the monitor means as are inherent in the servovalve means. This is achieved by providing a model which operates in the same manner as the valve spool.

The modifications shown in FIGS. 11–13 prevent any saturation of the torque motors which could otherwise possibly give a false indication of failure. Whereas in the form of the invention shown in FIGS. 1–10 the feedback spring connected to the flapper of the monitor fluid amplifier was connected to the flow control spool of the servovalve, in the modified form of the invention shown in FIGS. 11–13 a second driven member and a model of the valve spool is driven by the monitor fluid amplifier and the position of this model is fed back to the flapper of the monitor fluid amplifier through a feedback spring. In addition, a third fluid amplifier is provided comprising a pair of nozzles and a flapper with mechanical force feedback beng operatively interposed between such flapper and the valve spool and the model.

The arrangement is block diagrammed in FIG. 11 wherein a servovalve is shown as including a torque motor, a fluid amplifier driving a spool valve which controls a fluid flow Q leading to an actuator, with spool position feedback $K_{sf}$ to the summing point between the motor and amplifier. FIG. 11 also shows a monitor including a second torque motor, a second fluid amplifier driving a model, with model position feedback $K_{mf}$ to the summing point between the second motor and second amplifier, and a third amplifier the differential pressure output $\Delta P_m$ of which leads to a detector, with such third amplifier being controlled by the difference between the two force feedbacks $K_{sf}$ and $K_{mf}$.

Referring particularly to FIG. 12 which illustrated exemplary structure diagrammatically, the numeral 238 represents a first fluid amplifier including a pivotally mounted flapper 239 and a pair of opposed nozzles 240 and 241 between which the end of flapper 239 is movably arranged. The numeral 242 represents a torque motor associated with fluid amplifier 238 and comprises an armature 243 connected at its center to the end of flapper 239 and also includes a pair of coils 244 and 245.

A second fluid amplifier 246 and a second torque motor 248 are provided. The fluid amplifier 246 comprises a flapper 249 and an associated pair of nozzles 250 and 251. The torque motor 248 comprises an armature 252 and a pair of coils 253 and 254.

Operatively associated with the first fluid amplifier 238 is a valve spool indicated generally at 255. This valve spool is shown as slidably arranged in a cylinder 256 having left and right end chambers 258 and 259, respectively.

The second fluid amplifier 246 is shown as operatively associated with a cylindrical slide member or model 260 which is slidably arranged in a cylinder 261 having left and right end chambers 262 and 263, respectively.

A feedback spring member 264 is shown as operatively interposed between the valve slide 255 and flapper 239. A similar feedback spring member 265 is shown as operatively interposed between the model slide 260 and flapper 249.

A third fluid amplifier indicated generally at 266 is also provided. This third fluid amplifier 266 is shown as comprising a flapper 268 one end of which is movably arranged between a pair of opposing, spaced apart and fixed nozzles 269 and 270. The other end of this flapper 268 is shown as being cantilever-mounted on a suitable support indicated at 271. The flapper 268 may be considered a rigid member except for a flexible section 272 adjacent its cantilever mounting. A feedback spring member 257 is operatively interposed between flapper 268 and valve spool 255. A similar feedback spring member 267 is operatively interposed between flapper 268 and model slide 260.

The various nozzles 240, 241, 250, 251, 269 and 270 are supplied with fluid from a pressurized source designated $P_s$. A fluid restrictor is shown in the line leading to each such nozzle. More specifically, the numeral 273 represents a conduit having a fluid restrictor 274 therein and leading to nozzle 240. A branch conduit 275 connects conduit 273 on the downstream side of restrictor 274 with left spool end chamber 258. The numeral 276 represents a conduit having a fluid restrictor 278 therein and leading to nozzle 241. A branch conduit 279 connects conduit 276 on the downstream side of restrictor 278 with right spool end chamber 259.

The numeral 280 represents a conduit having a fluid restrictor 281 therein and which leads to nozzle 250. A branch conduit 282 connects conduit 280 with the left chamber 262 for model slide 260. The numeral 283 represents a conduit having a fluid restrictor 284 therein and leading to nozzle 251. A branch conduit 285 connects conduit 283 with the right end chamber 263 for model slide 260.

The numeral 286 represents a conduit having a fluid restrictor 288 therein and leading to nozzle 270. The numeral 289 represents a conduit having a fluid restrictor 290 therein and leading to nozzle 269. The numerals 291 and 292 represent branch conduits leading from nozzle conduits 286 and 289, respectively.

These conduits 291, 292 apply the monitoring differential pressure developed by fluid amplifier 266 as a measure of the difference in position of the valve spool 255 and the position of the model slide 260. The actuating conduits leading from cylinder 256 for valve spool 255 and for controlling the flow of fluid with respect to an actuator, are not shown in FIG. 12.

The coils 244, 245 of the torque motor 242 and the coils 253, 254 of the torque motor 248 are supplied with the same electrical command input signal. Should these torque motors become saturated so as to move the respective flappers 239, 249 hard over against the corresponding nozzles, resulting in radical displacements of the valve spool 255 and the model slide 260, these effects will be counterbalanced by the feedback springs 257 and 267, provided the displacements of the valve spool and model slide are the same. If they are different, the different feedback effects produced by the feedback springs 257, 267 will displace flapper 268 relative to its nozzles 269, 270 and thereby develop a pressure differential in conduits 291, 292 which may operate a detector (not shown) but similar to either detector 96 or 162 shown in FIG. 3 provided the monitoring differential pressure is above a predetermined error threshold.

Should there be a failure in the first or second torque motors 242, 248 or in the first or second hydraulic amplifiers 238, 246, for a given electrical command input signal, the displacements of the valve spool 255 and model slide 260 will not be comparable. This then results in unbalanced torques being applied to monitor flapper 268 which will move closer toward one and farther away from the other of its associated nozzles 269, 270 and develop monitoring differential pressure designated $\Delta P_m$.

The block diagram shown in FIG. 11 is also applicable to the mechanism schematically illustrated in FIG. 13 which is similar to that shown in FIG. 12 except for a different orientation of the components. Accordingly the same reference characters have been used in FIG. 13 except that they are distinguished by the suffix $a$. The essential difference is that in the arrangement shown in FIG. 13 the valve spool 255$a$ and the model slide 260$a$ are arranged coaxially end-to-end in spaced relation. The monitor flapper 268$a$ extends longitudinally transversely of the common axis of the valve spool 255$a$ and model slide 260$a$. The valve spool 255$a$ is shown as having an extension 255$b$ and the model slide 260$a$ has a similar but opposing extension 260$b$. The feedback spring 257$a$ is shown as being in the form of a helical compression spring operatively interposed between the outer end of valve spool extension 255$b$ and monitor flapper 268$a$. The feedback spring member 267$a$ is similar to spring 257$a$ but is operatively interposed between model slide extension 260$b$ and flapper 268$a$. It will be seen that the mechanism shown in FIG. 13 will operate in the same manner as previously described for the mechanism shown in FIG. 12.

From the foregoing it will be seen that the present invention provides a fluid powered servomechanism of a redundant, monitor type which accomplishes the objects stated and has the advantages indicated. Since modifications in the various arrangements shown and described may occur to those skilled in the art without departing from the spirit of the invention, the embodiments are illustrative and not limitative of the present invention which is to be measured by the scope of the appended claims.

What is claimed is:

1. In a fluid powered servomechanism, the combination comprising means arranged to create a first pressure in response to a command input signal, a movable valve member driven by said first pressure, means for producing a force responsive to the position of said valve member, and monitor means including a motor for receiving the same signal and arranged to create a monitoring pressure as a measure of the difference between said force and the output of said motor.

2. In a fluid powered servomechanism, the combination comprising means including a first motor for receiving a command input signal and a fluid amplifier, a second motor for also receiving the same signal, a movable valve member driven by said fluid amplifier, means for producing a force responsive to the position of said valve member, and means for developing a monitoring pressure as a measure of the difference between said force and the output of said second motor.

3. In a fluid powered servomechanism, the combination comprising means including a first motor for receiving a command input signal and a first fluid amplifier, a movable valve member driven by said first fluid amplifier for controlling fluid flow through at least one of a pair of conduits adapted to be connected to a fluid operated load, means for producing a force responsive to the position of said valve member, and monitoring means including a second motor for also receiving the same signal and a second fluid amplifier, said monitor means being arranged to develop a monitoring pressure as a measure of the difference between said force and the output of said second motor.

4. In a fluid powered servomechanism, the combination comprising valve means including a first motor for receiving a command input signal, a first fluid amplifier having a first movable member, a movable valve member driven by said first fluid amplifier, a first feedback spring member connected at one end to said first movable member and means constraining the other end of said first spring member to move with said valve member when displaced whereby the force exerted by said first spring member upon said first movable member is a measure of the displaced position of said valve member and counterbalances the force induced by said first motor, and monitor means including a second motor for also receiving the same signal, a second fluid amplifier having a second movable member, a second feedback spring member connected at one end to said second movable member and means for displacing the other end of said second spring member and for developing a monitoring pressure when the force exerted by said second spring member upon said second movable member does not counterbalance the force induced by said second motor.

5. In a fluid powered servomechanism, the combination comprising valve means including input stage means and output stage means, said input stage means including first fluid amplifier means having a first movable pressure regulating member, said output stage means including a movable valve member, load actuator means driven by fluid flow controlled by said valve member, first force feedback means operatively interposed between said valve member and said first movable member, monitoring pressure producing means including second fluid amplifier means having a second movable pressure regulating member and second force feedback means operatively interposed between said valve member and said second member, and actuator position feedback means operatively interposed between said actuator means and both said input stage means and said monitoring means.

6. In a fluid powered servomechanism, the combination comprising valve means including input stage means and output stage means, said input stage means including first fluid amplifier means having a first movable pressure regulating member, said output stage means including a movable flow control member, first force feedback means operatively interposed between said flow control member and said first movable member, and monitoring pressure producing means including second fluid amplifier means having a second movable pressure regulating member and a second force feedback means operatively interposed between said flow control member and said second movable member.

7. In a fluid powered servomechanism, the combination comprising a first fluid amplifier including a first movable pressure regulating member, a movable valve member controlling fluid flow, first force feedback means operatively interposed between said valve member and said first movable member, a second fluid amplifier including a second movable pressure regulating member, and second force feedback means operatively interposed between said valve member and said second movable member.

8. In a fluid powered servomechanism, valve means including a first motor for receiving a command input signal, a first fluid amplifier having a first movable member induced to move by said first motor in response to said signal for developing a first pressure, a movable valve member driven by said first pressure and a first feedback spring member operatively interposed between said valve member and said first movable member, and monitor means including a second motor for also receiving the same signal, a second fluid amplifier having a second movable member induced to move by said second motor in response to said same signal for developing a monitoring pressure and a second feedback spring member operatively interposed between said valve member and said second movable member.

9. In a fluid powered servomechanism, the combination comprising valve means including a first motor for receiving a command input signal, a first fluid amplifier having a first movable member induced to move by said first motor in response to said signal for developing a first pressure, a movable valve member driven by said first pressure and a first feedback spring member operatively interposed between said valve member and said first movable member, and monitor means including a second motor for also receiving the same signal, a second fluid amplifier having a second movable member induced to move by said second motor in response to said same signal for developing a second pressure, a movable model member driven by said second pressure, a second feedback spring member operatively interposed between said model member and second movable member, a third fluid amplifier having a third movable member for developing a monitoring pressure, a third feedback spring member operatively interposed between said valve member and said third movable member and a fourth feedback spring member operatively interposed between said model member and said third movable member.

10. In a fluid powered servomechanism, the combination comprising valve means including a first motor for receiving a command input signal, a first fluid amplifier having a first movable member induced to move by said first motor in response to said signal for developing a first pressure, a movable valve member driven by said first pressure and a first feedback spring member operatively interposed between said valve member and said first movable member, and monitor means including a second motor for also receiving the same signal, a second fluid amplifier having a second movable member induced to move by said second motor in response to said same signal for developing a second pressure, a movable model member driven by said second pressure, a second feedback spring member operatively interposed between said model member and second movable member and pressure producing means responsive to the difference in position between said valve and model members.

References Cited by the Examiner
UNITED STATES PATENTS

| | | | |
|---|---|---|---|
| 2,939,430 | 6/1960 | Westbury | 137—625.62 |
| 2,995,014 | 8/1961 | Horky et al. | 91—287 |
| 3,171,329 | 3/1965 | Rasmussen | 91—265 |
| 3,190,185 | 6/1965 | Rasmussen | 91—363 |

EDGAR W. GEOGHEGAN, *Primary Examiner.*

P. E. MASLOUSKY, *Assistant Examiner.*